(12) United States Patent
Carpini et al.

(10) Patent No.: US 7,668,460 B2
(45) Date of Patent: Feb. 23, 2010

(54) METHOD AND SYSTEM FOR AVOIDING AMPLIFIED SPONTANEOUS EMISSION LOOPS IN AN OPTICAL NETWORK

(75) Inventors: Walter Joseph Carpini, Stittsville (CA); John William Spicer, Greely (CA)

(73) Assignee: Alcatel-Lucent Canada Inc., Kanata, ON (CA)

(*) Notice: Subject to any disclaimer, the term of this patent is extended or adjusted under 35 U.S.C. 154(b) by 643 days.

(21) Appl. No.: 11/452,200

(22) Filed: Jun. 14, 2006

(65) Prior Publication Data

US 2006/0291860 A1    Dec. 28, 2006

(51) Int. Cl.
*H04J 14/00* (2006.01)
(52) U.S. Cl. .............. 398/59; 398/82; 398/83; 398/85; 398/66
(58) Field of Classification Search .......... 398/59, 398/82, 83, 85, 66
See application file for complete search history.

(56) References Cited

U.S. PATENT DOCUMENTS

| 6,025,941 | A | 2/2000 | Sristava |
| 7,054,562 | B1* | 5/2006 | Balakrishnan et al. ....... 398/83 |
| 7,190,896 | B1* | 3/2007 | Wang et al. ............... 398/30 |
| 7,583,432 | B2* | 9/2009 | Ghiggino et al. ........... 359/337 |
| 7,587,139 | B1* | 9/2009 | Bonnedal et al. ........... 398/83 |
| 2003/0002104 | A1* | 1/2003 | Caroli et al. .............. 359/127 |
| 2003/0099015 | A1* | 5/2003 | Kelly et al. ............... 359/127 |

FOREIGN PATENT DOCUMENTS

WO    WO 00/75851    12/2000

OTHER PUBLICATIONS

Traffic Engineering (TE) Extensions to OSPF Version 2, Katz, Kompella, et al, Juniper Networks, Yeung, Procket networks, IETF RFC3630, Sep. 2003.

* cited by examiner

*Primary Examiner*—Ken N Vanderpuye
*Assistant Examiner*—Hibret A Woldekidan
(74) *Attorney, Agent, or Firm*—IP-Mex Inc.

(57) ABSTRACT

Optical communication networks often incorporate fiber rings or fiber mesh topologies for interconnecting its nodes. Both of these topologies can contain closed optical loops at one or more wavelengths within the optical spectrum. In amplified optical systems, the inherent loss of these optical loops is counteracted by the amplifier gain. Thus, the optical loop may have a net loss that is too low to prevent excessive noise buildup resulting in a lasing fiber loop. The noise that builds up within such amplified systems is dominated by the Amplified Spontaneous Emission (ASE) noise resulting in ASE loops. Such loops can have a serious impact on all wavelengths carried by the fiber and lead to a partial or complete loss of end to end communication due to a severe degradation in signal to noise ratio. This invention provides an effective method and system for avoiding ASE loops in optical communication networks. The method deploys optical seams as well as a unique signature for a wavelength instance for achieving an effective solution that is resilient to errors and failures that may occur on the system both during service creation and normal operation.

22 Claims, 12 Drawing Sheets

METHOD AND SYSTEM FOR AVOIDING AMPLIFIED SPONTANEOUS EMISSION LOOPS IN AN OPTICAL NETWORK

FIELD OF INVENTION

The invention relates to optical communication networks, and in particular to a method and system for avoiding Amplified Spontaneous Emission (ASE) loops that can result in excessive noise buildup in an optical communication network.

BACKGROUND OF INVENTION

An optical communication network consists of multiple nodes each of which is controlled by a Network Element (NE). Most optical communication networks incorporate fiber rings or fiber mesh topologies for interconnecting its nodes, both of which can contain closed optical loops at one or more wavelengths within the optical spectrum. In amplified optical systems, the inherent loss of these optical loops is counteracted by the amplifier gain, such that the optical loop may have a net loss that is too low to prevent excessive noise buildup, or a net gain, resulting in a lasing fiber loop. The noise that builds up within such amplified systems is dominated by the Amplified Spontaneous Emission noise resulting in ASE loops.

These low loss loops, or gain loops, can have significant impact on all wavelengths within the fiber, causing partial or complete loss of end-to-end communication due to degraded Signal to Noise Ratio (SNR). Consequently, these loops need to be prevented by deploying appropriate techniques at the NEs. Moreover, if an optical network is susceptible to ASE loop occurrence, due to failures of network devices or elements for instance, the ASE loop susceptibility needs to be identified and eliminated. This is especially problematic in reconfigurable Optical Add Drop Multiplexer (OADM) and Wavelength Selectable Cross Connect (WSXC) environments. Thus, without some prevention mechanism, wavelength rings can be created as a result of simple mis-provisioning events or device failures within reconfigurable OADM and WSXC environments.

Different techniques have been deployed in prior art for avoiding ASE loops. The protection system deployed by one such technique described in U.S. Pat. No. 6,025,941 by Srivastava A. K. et al. issued Feb. 15, 2000 entitled "Stable Wavelength Division Multiplex Ring Network" changes the optical transmission characteristics of the transmission bandwidth of the network in such a way that the loop gain for any wavelength is smaller the network loop loss. Another way to prevent ASE gain loops is to impose one or more optical seams for a wavelength instance. Such a seam prevents the wavelength instance to continue in unspecified directions. For example, an optical seam created by the NE that adds a wavelength instance does not allow the wavelength instance to reach the preceding node. Similarly, an optical seam created by the NE that drops the wavelength instance does not allow the wavelength instance to continue beyond this node. Typically, a detailed network walk is required to ascertain the absence of a loop for a given wavelength instance. These methods either need altering the hardware or deploy a complex algorithm at NEs for loop identification at service creation time. ASE loops can also occur after service creation due to mis-provisioning or device failures. Preferably, the network itself is to be adaptive to events and should not only prevent ASE gain loops under normal operations but can also recognize when the system is susceptible to ASE gain loops under fault conditions. The prior arts discussed earlier do not address the scenario in which a fault has occurred in the system.

Thus there is a need in the field for the development of improved methods and system for avoiding ASE loops in an optical communication network.

SUMMARY OF THE INVENTION

Therefore it is an objective of the invention to provide an effective method and system for avoiding ASE loops in an optical communication network.

A method for avoiding Amplified Spontaneous Emission (ASE) loops in an optical communication network, including a plurality of Network Elements (NEs) and transmitting a plurality of wavelength instances, the method comprising the steps of: transmitting a wavelength instance from a head NE, where the wavelength instance is added to the optical communication network, to a tail NE, where the wavelength instance is dropped from the optical communication network; creating and advertising optical seams for the wavelength instance in the optical communication network, the optical seams preventing the wavelength instance from propagating on the optical communication network in unspecified directions; and processing the optical seams for the wavelength instance in the optical communication network. The step of creating and advertising optical seams for a wavelength instance, further comprises the steps of: receiving an add-request by the head NE for the wavelength instance for adding the wavelength instance into the optical communication network; completing an optical seam for the wavelength instance by the head NE for the wavelength instance; and advertising the optical seam by the head NE for the wavelength instance to other NEs in the optical communication network. The step of processing the optical seams further comprises the steps of: receiving a through-request by an intermediate NE for the wavelength instance, used for forwarding the wavelength instance to the next NE on a path for the wavelength instance; receiving an advertisement from the head NE for the wavelength instance; and completing the through-request; wherein the path includes the head NE, the tail NE and the intermediate NEs for the wavelength instance. The step of creating and advertising optical seams for a wavelength instance, further comprises the steps of: creating and advertising the optical seam by the head NE for the wavelength instance; and creating and advertising the optical seam by the tail NE for the wavelength instance. The step of creating and advertising the optical seam by the head NE further comprises the steps of: receiving an add-request by the head NE for the wavelength instance for adding the wavelength instance into the optical communication network; completing the optical seam by the head NE for the wavelength instance; and advertising the optical seam by the head NE for the wavelength instance to the other NEs in the optical communication network. The step of creating and advertising the optical seam by the tail NE further comprises the steps of: receiving a drop-request by the tail NE for the wavelength instance for dropping the wavelength instance from the optical communication network; completing the optical seam by the tail NE for the wavelength instance; and advertising the optical seam by the tail NE for the wavelength instance to the other NEs in the optical communication network. The step of processing the optical seams further comprises the steps of: receiving a through-request by an intermediate NE for the wavelength instance, used for forwarding the wavelength instance to the next NE on a path for the wavelength instance; receiving the advertisement from the head NE for the wavelength instance; receiving the advertisement from the tail NE for the wavelength instance; and completing the through-request; wherein the path includes the head NE, the tail NE and the intermediate NEs for the wavelength instance.

A method for avoiding Amplified Spontaneous Emission (ASE) loops in an optical communication network, including a plurality of Network Elements (NEs) and transmitting a plurality of wavelength instances, the method comprising the steps of: transmitting a wavelength instance from a head NE, where the wavelength instance is added to the optical communication network, to a tail NE, where the wavelength instance is dropped from the optical communication network; creating an optical seam by the head NE for the wavelength instance in the optical communication network, the optical seam preventing the wavelength instance from propagating on the optical communication network in unspecified directions; creating an optical seam by the tail NE for the wavelength instance in the optical communication network; processing optical seams at intermediate NEs in the optical communication network; and eliminating collisions among wavelength instances. The step of creating an optical seam by the head NE further comprises the steps of: receiving an add-request by the head NE for the wavelength instance for adding the wavelength instance into the optical communication network; completing the optical seam by the head NE for the wavelength instance; and advertising the optical seam by the head NE for the wavelength instance to the other NEs in the optical communication network.

The step of creating an optical seam by the tail NE further comprises the steps of: receiving a drop-request by the tail NE for the wavelength instance for dropping the wavelength instance from the optical communication network; completing the optical seam by the tail NE for the wavelength instance; and advertising the optical seam by the tail NE for the wavelength instance to the other NEs in the optical communication network. The step of processing the optical seams further comprises the steps of: receiving a through-request by the intermediate NE for the wavelength instance for forwarding the wavelength instance to the next NE on a path for the wavelength instance; receiving the advertisement from the head NE for the wavelength instance; receiving the advertisement from the tail NE for the wavelength instance; receiving a valid channel ID generated by using Wavelength Tracker Technology for the wavelength instance; and completing the through-request; wherein the path includes the head NE, the tail NE and the intermediate NEs for the wavelength instance and the Wavelength Tracker technology provides a unique signature in the form of a low frequency dither tone modulation called Wavekey for each wavelength instance. The step of eliminating collisions among the wavelength instances further comprises the steps of: identifying collisions of wavelength instances at the NEs; and forcing a break at the NEs that identify the collisions. The step of identifying collisions among wavelength instances at the NEs further comprises the steps of: monitoring the wavelength instances continuously; and observing a plurality of channel IDs generated at the instant of collisions.

A system for avoiding Amplified Spontaneous Emission (ASE) loops in an optical communication network, including a plurality of Network Elements (NEs) and transmitting a plurality of wavelength instances, the system comprising: means for transmitting a wavelength instance from a head NE, where the wavelength instance is added to the optical communication network, to a tail NE, where the wavelength instance is dropped from the optical communication network; means for creating and advertising optical seams for the wavelength instance in the optical communication network, the optical seams preventing the wavelength instance from propagating on the optical communication network in unspecified directions; and means for processing the optical seams for the wavelength instance in the optical communication network. The means for creating and advertising optical seams for a wavelength instance, further comprises: means for receiving an add-request by the head NE for the wavelength instance for adding the wavelength instance into the optical communication network; means for completing an optical seam for the wavelength instance by the head NE for the wavelength instance; and means for advertising the optical seam by the head NE for the wavelength instance to other NEs in the optical communication network. The means for processing the optical seams further comprises: means for receiving a through-request by an intermediate NE for the wavelength instance used for forwarding the wavelength instance to the next NE on a path for the wavelength instance; means for receiving an advertisement from the head NE for the wavelength instance; and means for completing the through-request; wherein the path includes the head NE, the tail NE and the intermediate NEs for the wavelength instance. The means for creating and advertising optical seams for a wavelength instance, further comprises: means for creating and advertising the optical seam by the head NE for the wavelength instance; and means for creating and advertising the optical seam by the tail NE for the wavelength instance. The means for creating and advertising the optical seam by the head NE further comprises: means for receiving an add-request by the head NE for the wavelength instance for adding the wavelength instance into the optical communication network; means for completing the optical seam by the head NE for the wavelength instance; and means for advertising the optical seam by the head NE for the wavelength instance to the other NEs in the optical communication network. The means for creating and advertising the optical seam by the tail NE further comprises: means for receiving a drop-request by the tail NE for the wavelength instance for dropping the wavelength instance from the optical communication network; means for completing the optical seam by the tail NE for the wavelength instance; and means for advertising the optical seam by the tail NE for the wavelength instance to the other NEs in the optical communication network. The means for processing the optical seams further comprises: means for receiving a through-request by the intermediate NEs for the wavelength instance for forwarding the wavelength instance to the next NE on a path for the wavelength instance; means for receiving the advertisement from the head NE for the wavelength instance; means for receiving the advertisement from the tail NE for the wavelength instance; and means for completing the through-request; wherein the path includes the head NE, the tail NE and the intermediate NEs for the wavelength instance.

A system for avoiding Amplified Spontaneous Emission (ASE) loops in an optical communication network, including a plurality of Network Elements (NEs) and transmitting a plurality of wavelength instances, the system comprising: means for transmitting a wavelength instance from a head NE, where the wavelength instance is added to the optical communication network, to a tail NE, where the wavelength instance is dropped from the optical communication network; means for creating an optical seam by the head NE for the wavelength instance, where the optical seams are used for preventing the wavelength instance from propagating on the optical communication network in unspecified directions; means for creating an optical seam by the tail NE for a wavelength instance; means for processing optical seams at intermediate NEs in the optical communication network; and means for eliminating collisions among wavelength instances. The means for creating an optical seam by the head NE further comprises: means for receiving an add-request by the head NE for the wavelength instance for adding the wavelength instance into the optical communication network; means for completing the optical seam by the head NE for the wavelength instance; and means for advertising the optical seam by the head NE for the wavelength instance to the other NEs in the optical communication network. The means for creating an optical seam by the tail NE further comprises: means for receiving a drop-request by the tail NE for the wavelength instance for dropping the wavelength instance from the optical communication network; means for completing the optical seam by the tail NE for the wavelength instance; and means for advertising the optical seam by the tail NE for the wavelength instance to the other NEs in the optical communication network. The means for processing optical seams further comprises: means for receiving a through-request by the intermediate NE for the wavelength instance for forwarding the wavelength instance to the next NE on a path for the wavelength instance; means for receiving the advertisement from the head NE for the wavelength instance; means for receiving the advertisement from the tail NE for the wavelength instance; means for receiving a valid channel ID generated by using Wavelength Tracker Technology for the wavelength instance; and means for completing the through-request; wherein the path includes the head NE, the tail NE and the intermediate NEs for the wavelength instance and the Wavelength Tracker technology provides a unique signature in the form of a low frequency dither tone modulation called Wavekey for each wavelength instance. The means for eliminating collisions among wavelength instances further comprises: means for identifying collisions of wavelength instances at the NEs; and means for forcing a break at the NEs that identify the collisions. The means for identifying collisions among wavelength instances at the NEs further comprises: means for monitoring the wavelength instances continuously; and means for observing a plurality of channel IDs generated at the instant of collisions.

BRIEF DESCRIPTION OF THE DRAWINGS

Further features and advantages of the invention will be apparent from the following description of the embodiment, which is described by way of example only and with reference to the accompanying drawings in which.

DETAILED DESCRIPTION OF THE PREFERRED EMBODIMENTS

Figure 1:
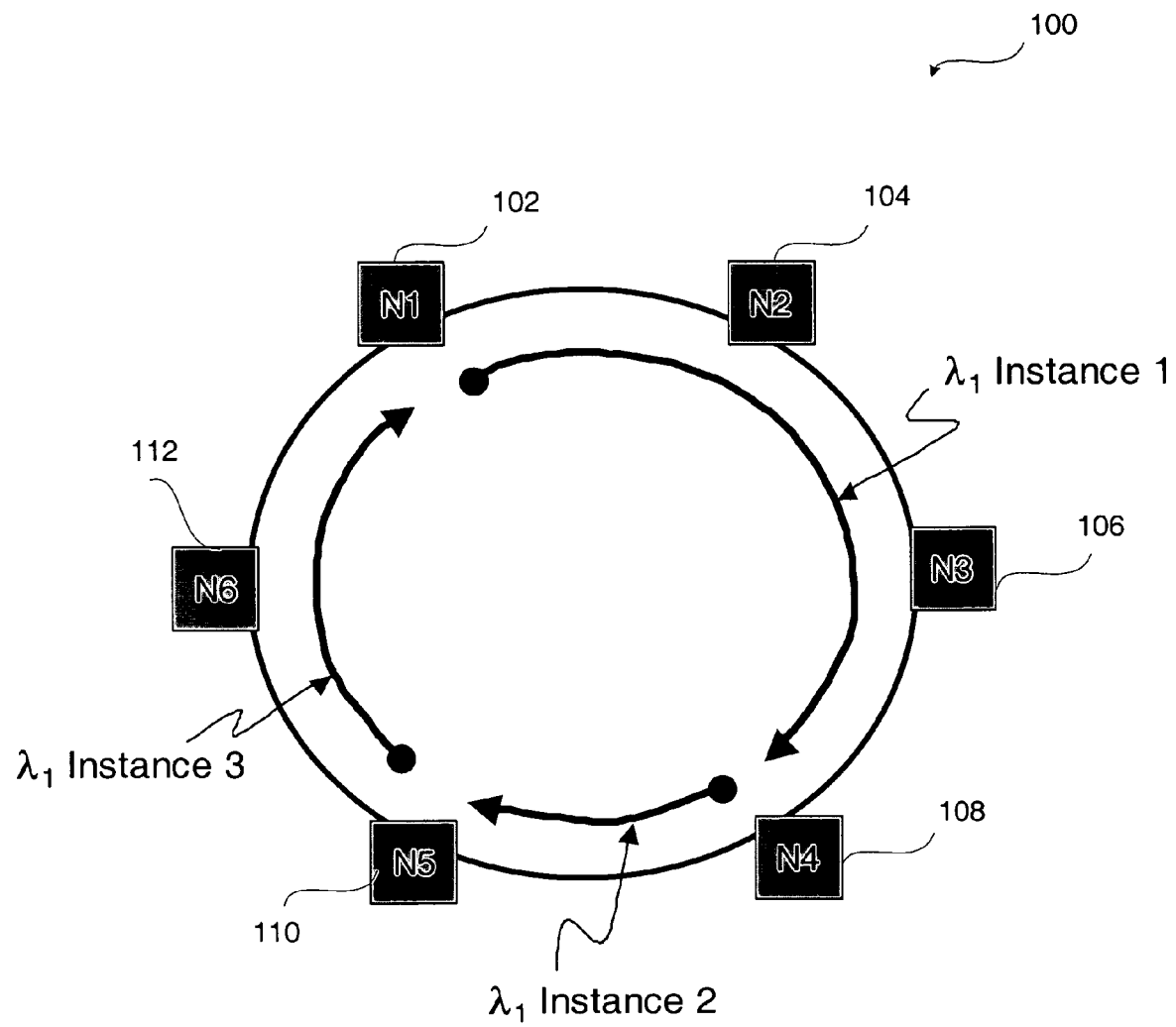
FIG. 1 presents an example optical communication network with three wavelength instances.

Before describing the embodiments of the invention the terminologies used in the description are introduced. An example optical communication network is shown in FIG. 1. The network consists of six NE's: N1 102, N2 104, N3 106, N4 108, N5 110, and N6 112. A NE is connected to its two neighboring NE's through optical links. Multiple wavelength instances each of which is identified by a separate channel ID can be used in such a network, with each wavelength instance flowing through a particular network segment. FIG. 1 for example, shows three instances of the wavelength $\lambda_1$: $\lambda_1$ instance 1, $\lambda_1$ instance 2 and $\lambda_1$ instance 3. Each wavelength instance is added to the optical communication network by a head NE, is forwarded from one intermediate NE to another by intermediate NEs and is dropped from the network by the tail NE. For the $\lambda_1$ Instance 1 in FIG. 1 for example, the head NE is N1 102, the tail NE is N4 108 whereas N2 104 and N3 106 are the intermediate NEs. The set of NE's that include the head NE, the tail NE and the intermediate NEs that lie between the head NE and the tail NE constitute the path for the wavelength instance. The wavelength instance that is added to the optical communication network by the head NE is forwarded by the intermediate NEs until it reaches the tail NE where it is dropped from the network.

Three embodiments for the invention are described. The embodiments differ from one another in terms of the degree of resilience they provide. All the embodiments deploy optical seams for preventing a wavelength instance to be transmitted in unspecified directions. Note that an optical seam used in the embodiments is on the Optical Channel (OCH) layer and not on the Optical Multiplexing Section (OMS) nor the Optical Transmission Section (OTS) layers. The first embodiment ensures a single optical seam for the avoidance of ASE loops whereas the second ensures two optical seams so that if one of the optical seams fails due to a fault in the network the second is still able to prevent an ASE loop. In addition to the two optical seams the third embodiment provides a facility for continuous monitoring of the wavelength instance such that ASE gain loops due to mis-provisioning or device failure can be avoided. The continuous monitoring technique is also useful after service creation when a collision among wavelength instances that may accrue from a mis-provisioning or a device failure and can lead to an ASE loop is detected. Upon detection of such a collision the third embodiment provides a method and system for taking corrective actions such that ASE loops are avoided. A detailed discussion of each of the embodiments is presented next.

As discussed earlier the wavelength instance is added to the network by the head NE, transmitted to a tail NE where it is dropped from the network. The first two embodiments are based on the creation and advertisement of optical seams: by the head NE in the first embodiment and the by both the head NE and the tail NE in the second embodiment. Such an advertisement may be provided by an existing technique such as OSPF-TE Opaque LSAs described in Katz D. et al. "3630

Traffic Engineering (TE) Extensions to OSPF Version 2", September 2003 (Format: TXT=27717 bytes) (Updates RFC2370) (Updated by RFC4203) (Status: PROPOSED STANDARD). A short description of the first embodiment is presented next. The method deployed by the head NE for the wavelength instance is illustrated with the help of FIG. 2. Upon start (box 202) the head NE receives an add-request for adding a specific wavelength instance to the optical communication network (box 204). The head NE performs the add operation and then creates an optical seam for the wavelength instance that does not allow the wavelength instance to propagate in unspecified directions. For the example network shown in FIG. 1, the optical seam created at the head NE N1 102 will not allow the wavelength instance, $\lambda_1$ instance 1, to reach N6 112. After creating the optical seam the head NE advertises the optical seam creation to all the other NEs in the network (box 208) and exits (box 210). NEs (e.g. N5 110 and N6 112 in the example of FIG. 1) that do not lie in the path that spans from a head NE to the tail NE and includes the intermediate NEs for the wavelength instance record this information but do not process it. An intermediate NE that lies in the path processes the advertisement when it receives a through-request for forwarding the wavelength instance to the next NE in the path for the wavelength instance.

Figure 3:
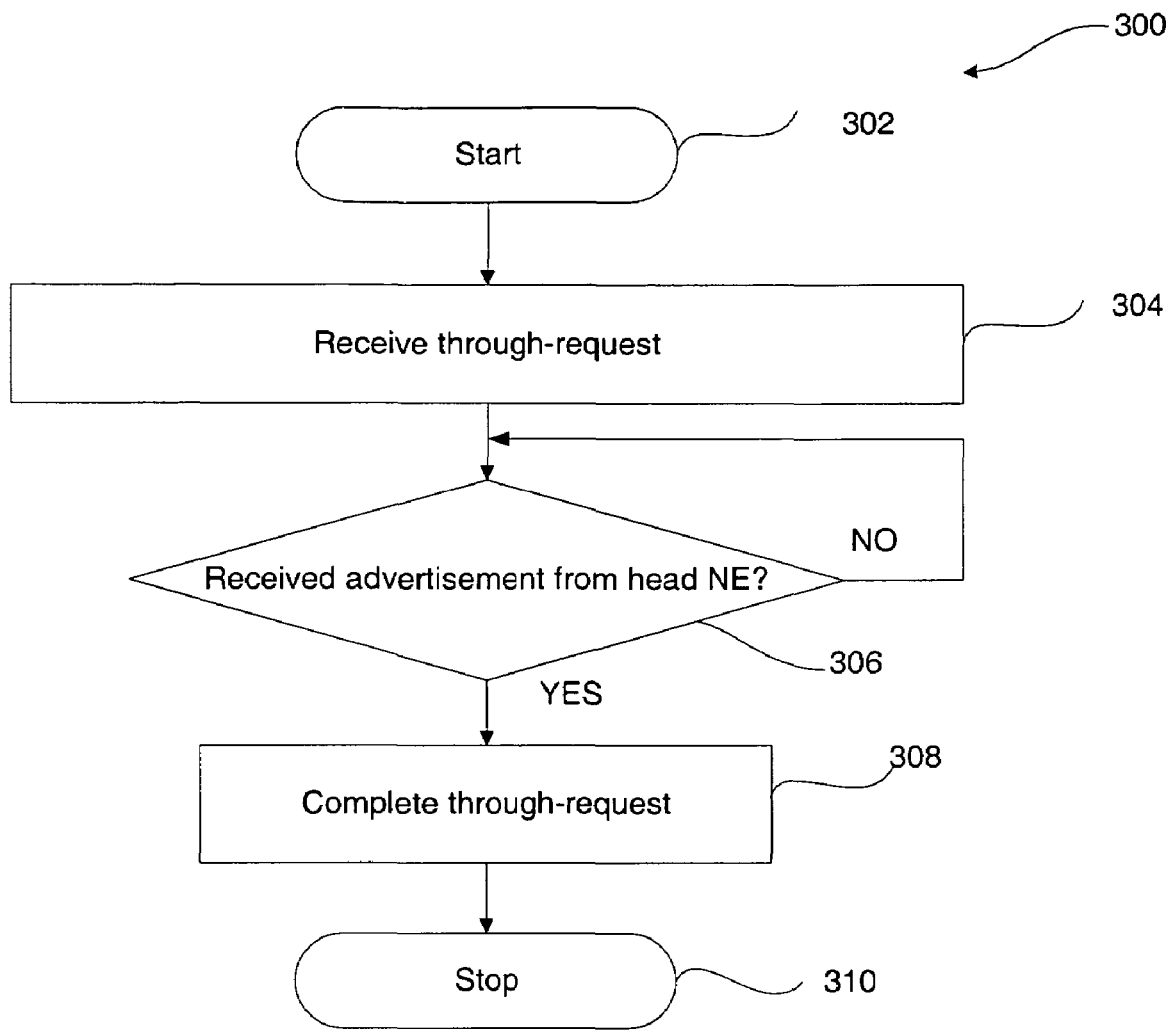
FIG. 3 shows a flowchart that illustrates the steps of the method used by the intermediate NEs in the first embodiment.

The method deployed by an intermediate NE is explained with the help of the flow chart presented in FIG. 3. Upon start (box 302) the intermediate NE receives a through-request (box 304). The procedure then checks whether or not an advertisement for optical seam creation is received from the head NE of the wavelength instance (box 306). If the advertisement is not received the procedure exits NO and loops back to the entry of box 306. If the advertisement is received the procedure exits YES from box 306 and completes the through-request (box 308) and exits (box 310).

Figure 4:
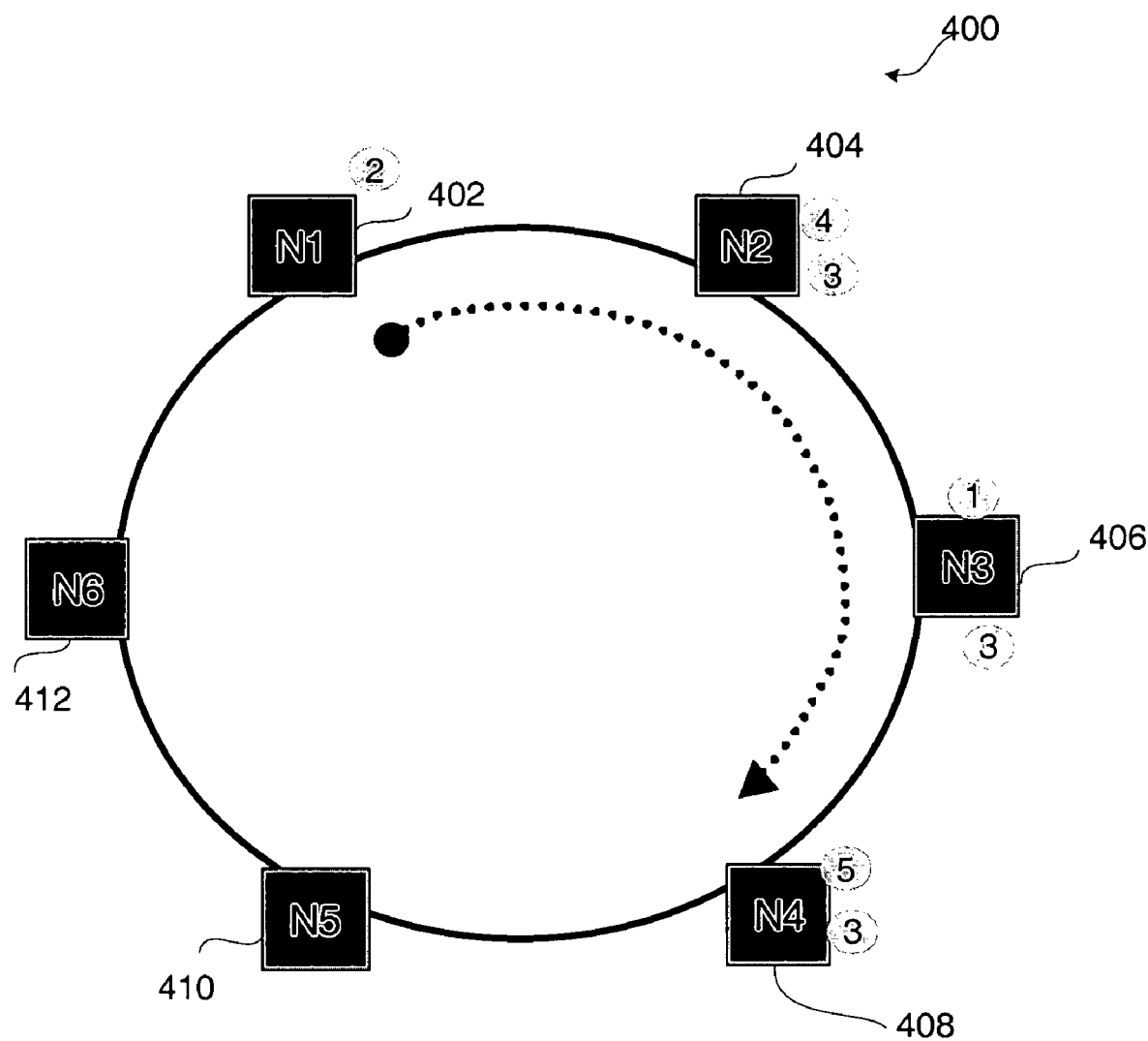
FIG. 4 illustrates an example sequence of events that occur when the first embodiment is used.

The operations performed at the head NE and the intermediate NEs are asynchronous and can occur in any order. The creation of a service for a wavelength instance deploying the method of this embodiment is explained further with the help of an example presented in FIG. 4. The optical communication network shown in the figure consists of six NEs: N1 402, N2 404, N3 406, N4 408, N5 410 and N6 412. The head NE and the tail NE for the wavelength instance are N1 402 and N4 408 respectively whereas N2 404 and N3 406 are the intermediate NEs. The wavelength instance is added at the head NE N1 402 and is dropped at the tail NE N4 408. The sequence of events that lead to the creation of service is presented next. The event numbers in the following text correspond to the numbers shown within the gray circles in FIG. 4.

1—Through-request received at N3 406. Completing the through-request is held off since the optical seam advertisement is not received.

2—Add-request is received at N1 402.

N1 402 creates optical seam and performs the add operation.

N1 402 advertises optical seam creation.

3—All NE's receive optical seam creation advertisement and record it.

N3 406 completes the through-request.

4—N2 404 receives through-request.

Since optical seam advertisement is already received, N2 completes the through-request immediately.

5—N4 408 receives drop-request.

N4 408 performs drop.

Service is created and light flows.

The method of the second embodiment is based on the creation and advertisement of optical seams by both the head NE and the tail NE for the wavelength instance. The advantage of creating a second optical seam during the creation of service is the added resilience: if one of the optical seams fails, an ASE loop is still prevented by the second optical seam. The method deployed at the head NE is exactly the same as the one depicted for the first embodiment in FIG. 2. The method deployed by the tail NE is explained with the help of the flow chart in FIG. 5. Upon start (box 502) the head NE receives a drop-request for dropping a specific wavelength instance to the optical communication network (box 504). The tail NE performs the drop operation and then creates an optical seam for the wavelength instance that does not allow the wavelength instance to continue in unspecified directions (box 506). For the example network shown in FIG. 1, the optical seam created at the tail NE N4 108 will not allow the wavelength instance, $\lambda_1$ instance 1, to reach N5 110. After creating the optical seam the tail NE advertises the optical seam creation to all the other NEs in the network (box 508) and exits (box 510). NEs that do not lie in the path (e.g. N5 110 and N6 112 in the example of FIG. 1) record this information but do not process it. An intermediate NE that lies in the path between the head NE and the tail NE processes the advertisement when it receives a through-request for forwarding the wavelength instance to the next NE in the path.

Figure 6:
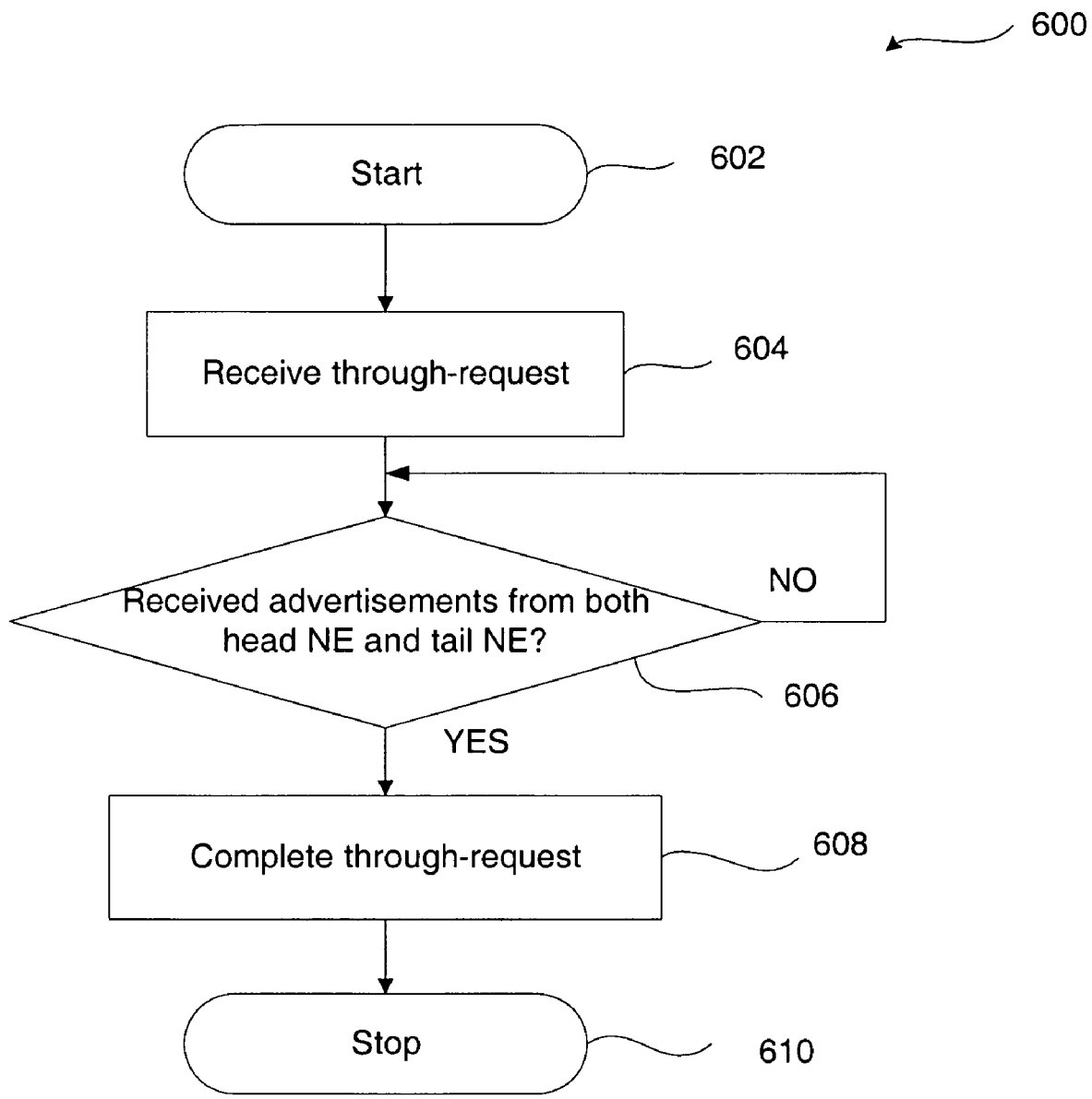
FIG. 6 shows a flowchart that illustrates the steps of the method used by the intermediate NEs in the second embodiment.

The method deployed by an intermediate NE is explained with the help of the flow chart presented in FIG. 6. Upon start (box 602) the intermediate NE receives a through-request (box 604). The procedure then checks whether or not advertisements for optical seam creation are received from both the head NE and the tail NE for the wavelength instance (box 606). If both the advertisements are not received the procedure exits NO and loops back to the entry of box 606. If both advertisements are received the procedure exits YES from box 606 and completes the through-request (box 608) and exits (box 610).

Figure 7:
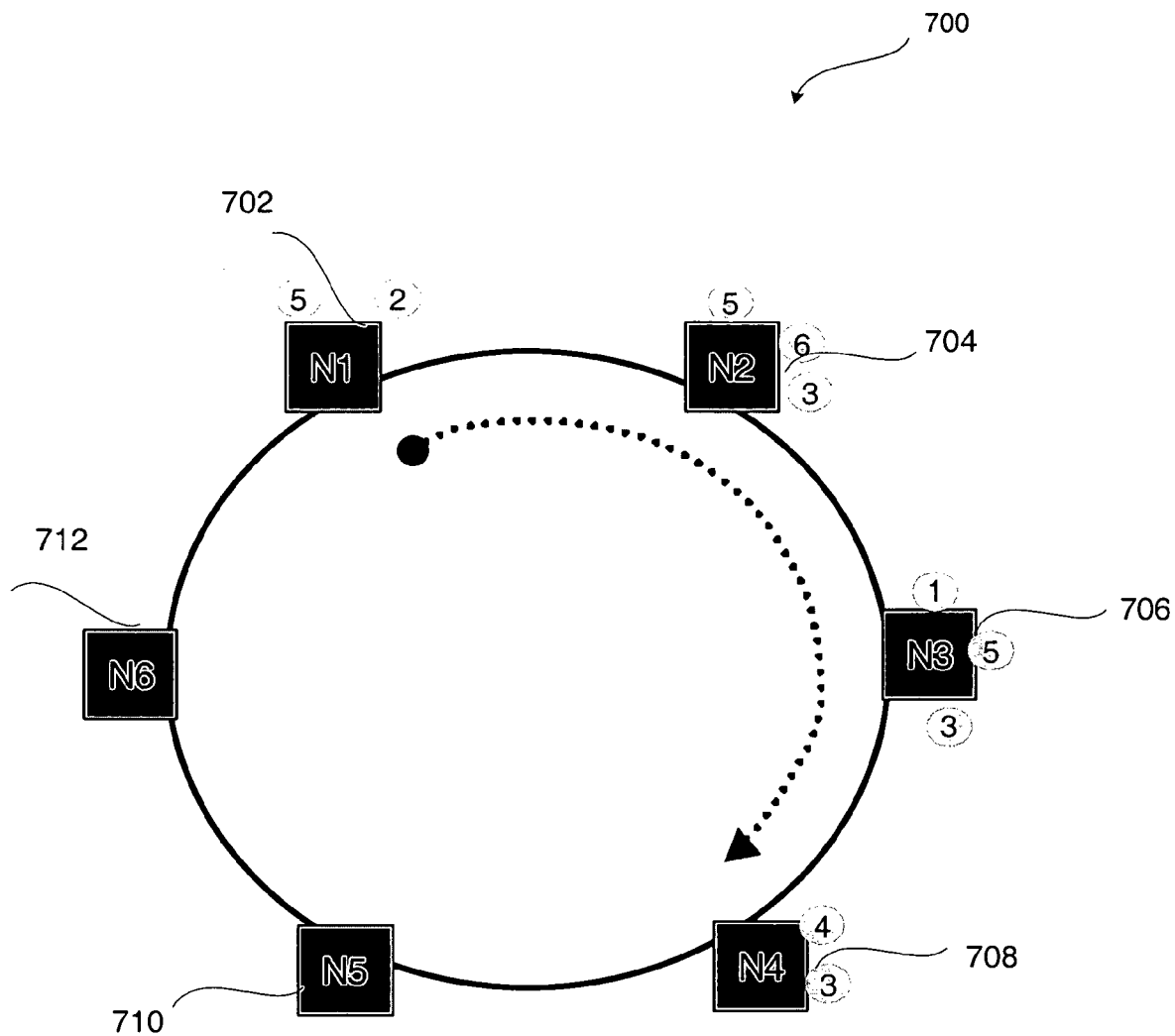
FIG. 7 illustrates an example sequence of events that occur when the second embodiment is used.

As mentioned earlier, the operations performed at the head NE, the tail NE and the intermediate NEs are asynchronous and can occur in any order. The creation of a service for a wavelength instance deploying the method of this embodiment is explained further with the help of an example presented in FIG. 7. The optical communication network shown in the figure consists of six NEs: N1 702, N2 704, N3 706, N4 708, N5 710 and N6 712. The head NE and the tail NE for the wavelength instance are N1 702 and N4 708 respectively whereas N2 704 and N3 706 are the intermediate NEs. The wavelength instance is added at the head NE N1 702 and is dropped at the tail NE N4 708. The sequence of operations that lead to the creation of service is captured in the sequence of events presented next. The event numbers in the following text correspond to the numbers shown within gray circles in FIG. 7.

1—Through-request received at N3 706. Completing the through-request is held off since the optical seam advertisements are not yet received.

2—Add-request is received at N1 702.

N1 702 creates optical seam and performs the add operation.

N1 702 advertises optical seam creation.

3—All NE's receive optical seam creation advertisement and record it.

4—N4 708 receives a drop-request.

N4 708 creates second optical seam and performs the drop operation.

N4 708 advertises optical seam creation.

5—All NE's receive optical seam creation advertisement and record it.

N3 completes the through-request.

6—N2 704 receives a through-request.

Since both optical seam advertisements are already known, N2 completes the through-request immediately.

Service is created and light flows.

Figure 8:
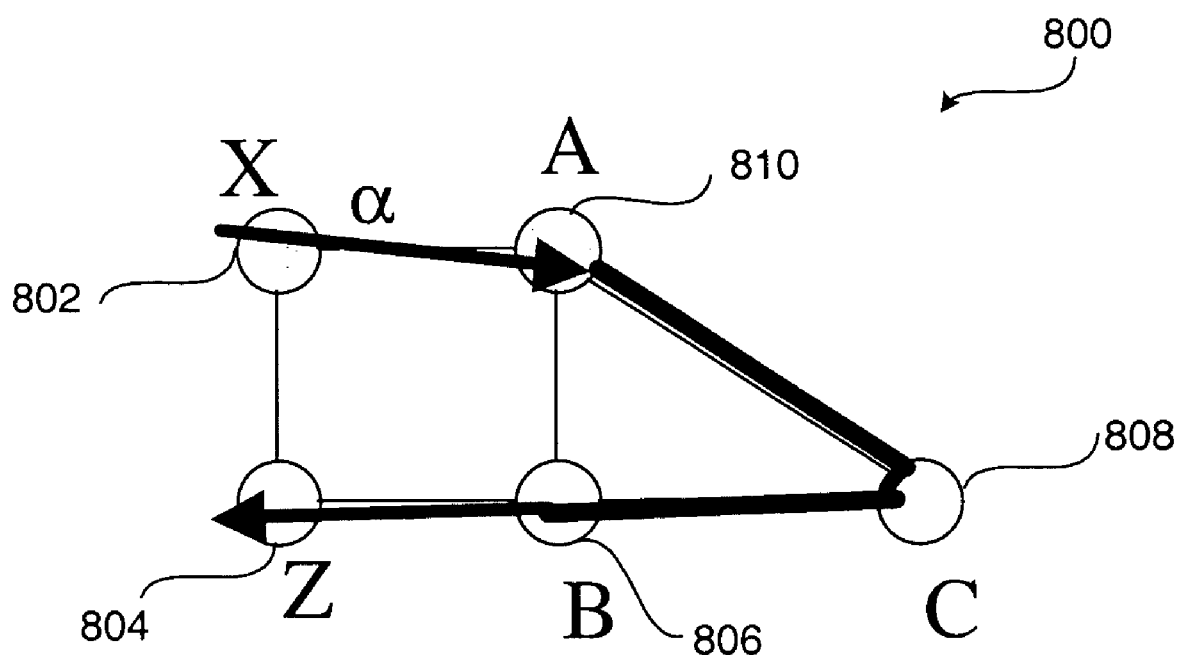
FIG. 8(a) presents the desired connectivity for an example optical communication network.
FIG. 8(b) illustrates the occurrence of an ASE loop due to a mis-provisioning event.
Figure 8B:
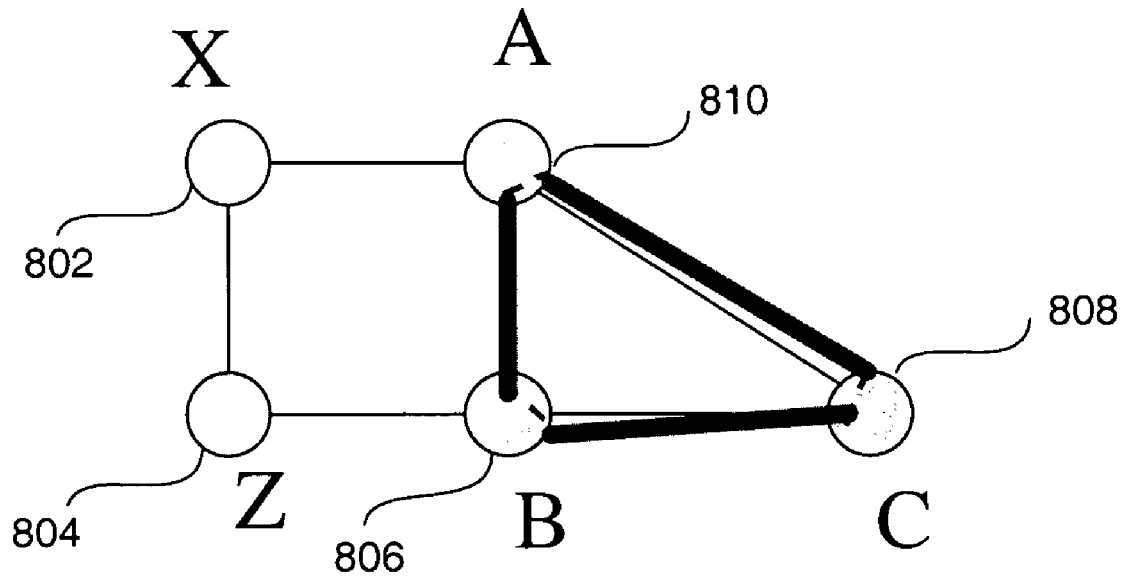

In addition to the two optical seams used in the second embodiment, the method of the third embodiment introduces a step of checking the valid channel ID for avoiding ASE loops that may occur as a result of a number of mis-provisioning operations. This is explained with the help of FIG. 8. Consider a set of NEs X 802, Z 804, B 806, C 808 and A 810. The desired path for a given wavelength instance with a channel ID α is shown in bold in FIG. 8(*a*) with X 802 as the head NE and Z 804 as the tail NE. Consider a mis-provisioning event in B 806 that resulted in connecting B 806 to A 810 instead of Z 804. In the absence of channel ID monitoring, even if both optical seams are advertised, this error can lead to an ASE loop shown in FIG. 8(*b*), the loop including A 810, C 808 and B 806. This is because as soon as both optical seams are advertised A 810, B 806 and C 808 will comply with the through requests that can lead to the ASE loop. The third embodiment that ensures that a valid channel ID is observed at the NE before completing a though-request prevents the formation of such an ASE loop. In this example, since the expected channel ID α is absent on the interface to B 806 at A 810, A 810 will not complete the through-request. Similarly due to the absence of channel ID α at the provisioned interfaces, B 806 and C 808 will not complete their through-requests. This prevents the formation of the ASE loop shown in FIG. 8(*b*). The channel ID is incorporated by using the Wavelength Tracker technology that is discussed next.

Tropic Network's Wavelength Tracker technology is useful in monitoring of optical networks that carry wavelength instances. Monitoring of the path followed by a wavelength instance is achieved by deploying Wavelength Tracker that identifies the path. The Wavelength Tracker technology applies a unique optical signature to each wavelength instance at the Dense Wavelength Division Multiplexing (DWDM) layer. The unique optical signature includes a low frequency modulation of one or more dither tones onto the wavelength instance, which uniquely identify the wavelength instance. This optical signature (also called a Wavekey) is applied to the wavelength instance at the head NE for the wavelength instance. The optical signature is detectable at intermediate NEs on the path via inexpensive decoders present on line cards. Detection of the optical signature is accomplished without an Optical-Electrical-Optical (OEO) conversion at intermediate nodes, thus resulting in a cost-effective solution. Wavelength Tracker technology is used for a variety of applications including optical power monitoring and loss of light avoidance. The technology for generating and detecting Wavekeys has been described in U.S. patent application Ser. No. 09/963,501 by Obeda, P. D., et al, entitled "Topology Discovery in Optical WDM Networks", filed on 27 Sep. 2001.

Figure 2:
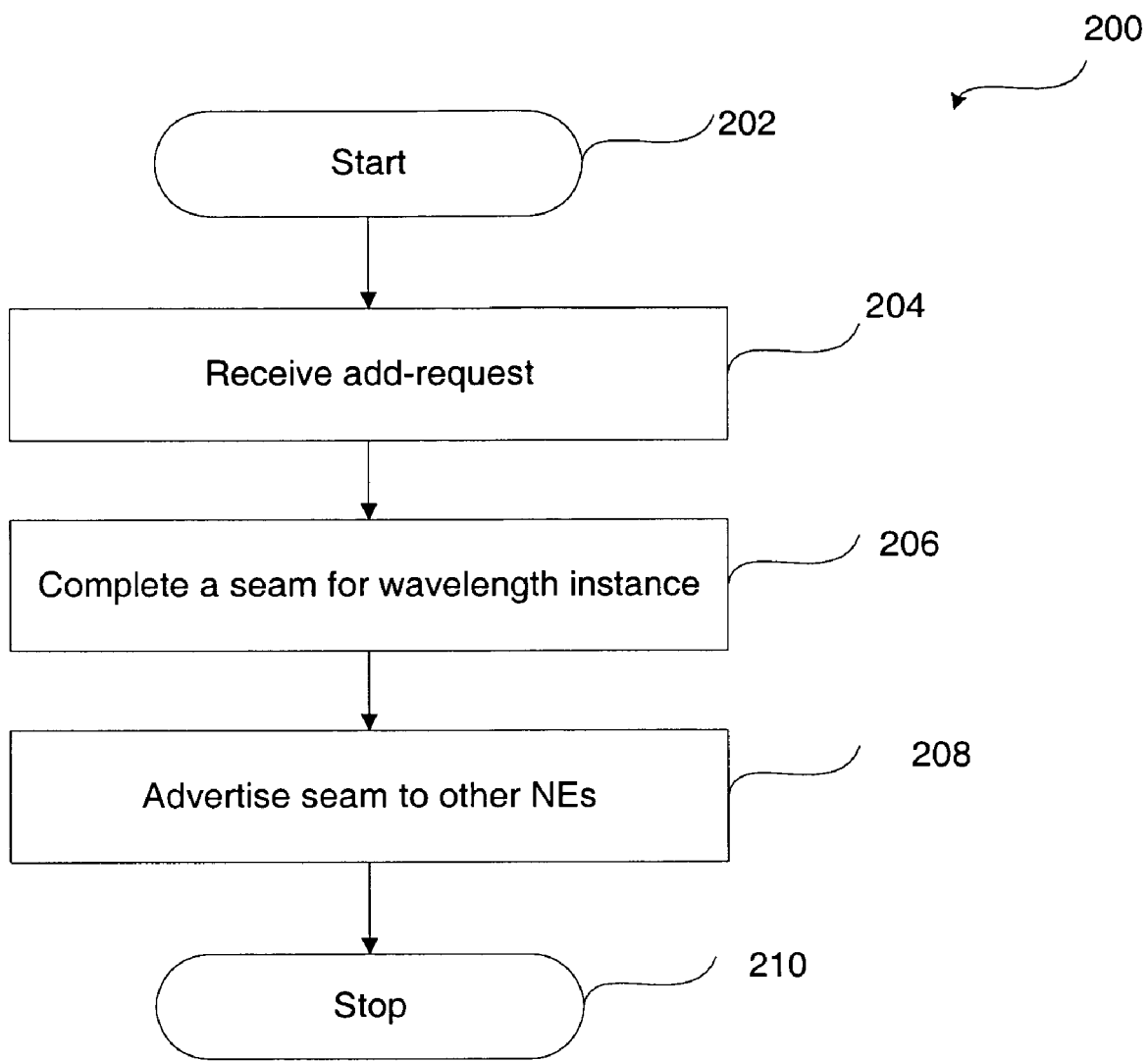
FIG. 2 shows a flowchart that illustrates the steps of the method used by the head NE in the first embodiment.
Figure 5:
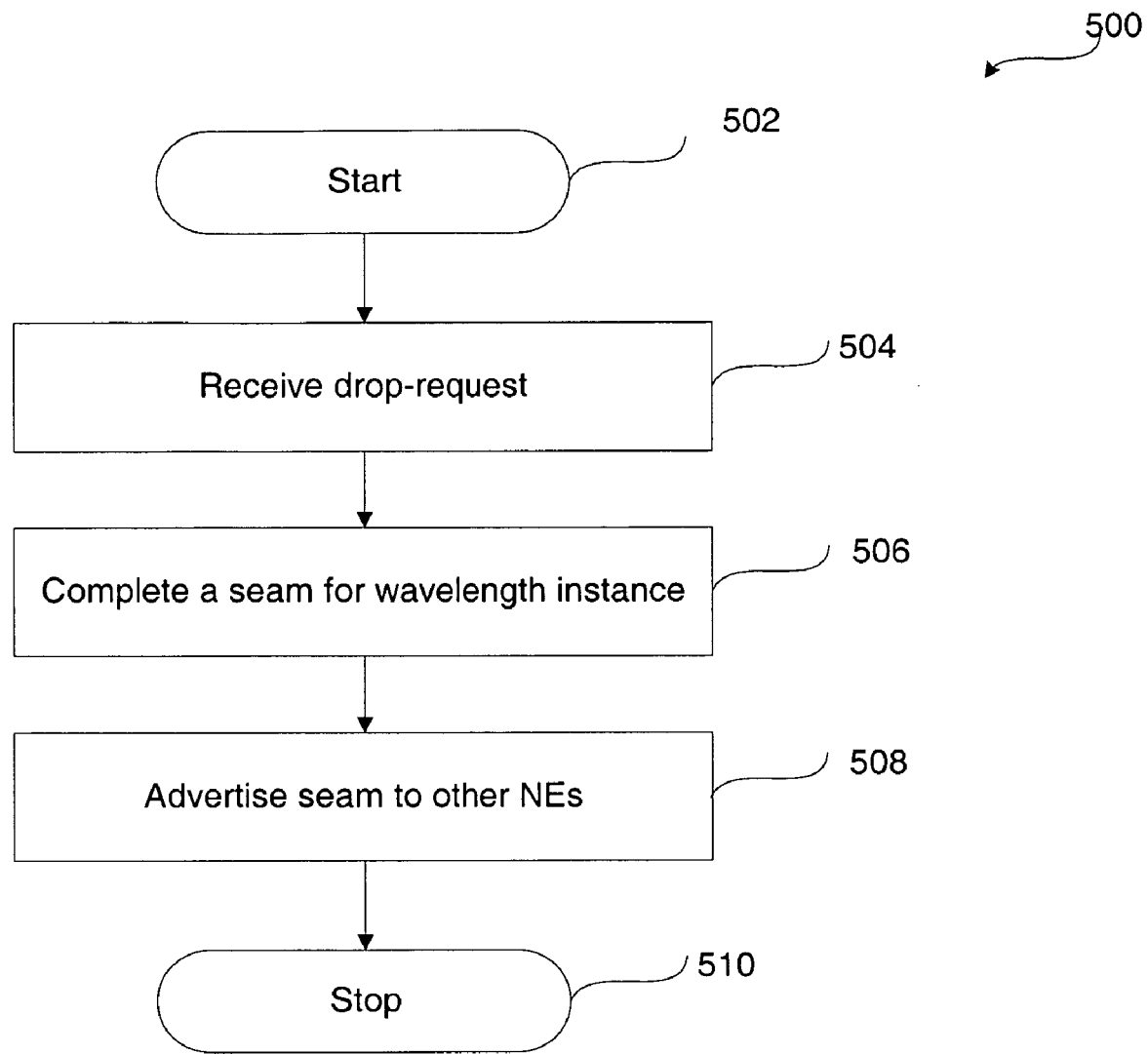
FIG. 5 shows a flowchart that illustrates the steps of the method used by the head NE in the second embodiment.
Figure 9:
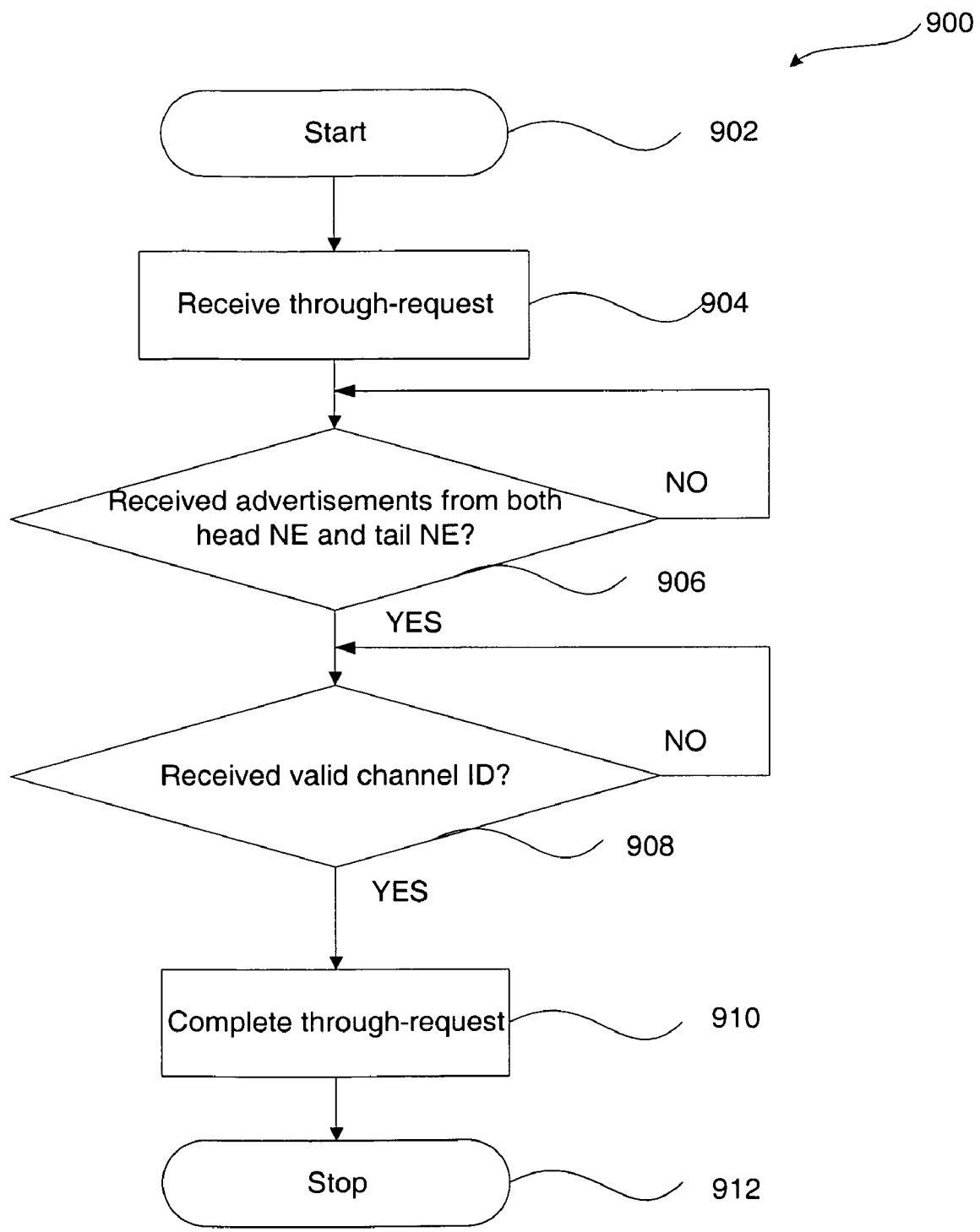
FIG. 9 shows a flowchart that illustrates the steps of the method used by the intermediate NEs in the third embodiment.

As discussed earlier the wavelength instance is added to the network by the head NE, transmitted to a tail NE where it is dropped from the network. The methods deployed in the third embodiment by the head NE and the tail NE for the wavelength instance are the same as depicted in FIG. 2 and FIG. 5 respectively. The method used at the intermediate NEs is explained with the flowchart presented in FIG. 9. Upon start (box 902) the intermediate NE receives a through-request (box 904). The procedure then checks whether or not advertisements for optical seam creation are received from both the head NE and the tail NE for the wavelength instance (box 906). If both the advertisements are not received the procedure exits NO and loops back to the entry of box 906. If both advertisements are received the procedure exits YES from box 906. The next step is to check whether or not a valid channel ID for the wavelength instance is received at the intermediate NE (box 908). If a valid channel ID is not received the procedure exits NO from box 908 and loops back to the entry of box 908. Once a valid channel ID is received the procedure exits YES from box 908, completes the through-request (box 910) and exits (box 912).

Figure 10:
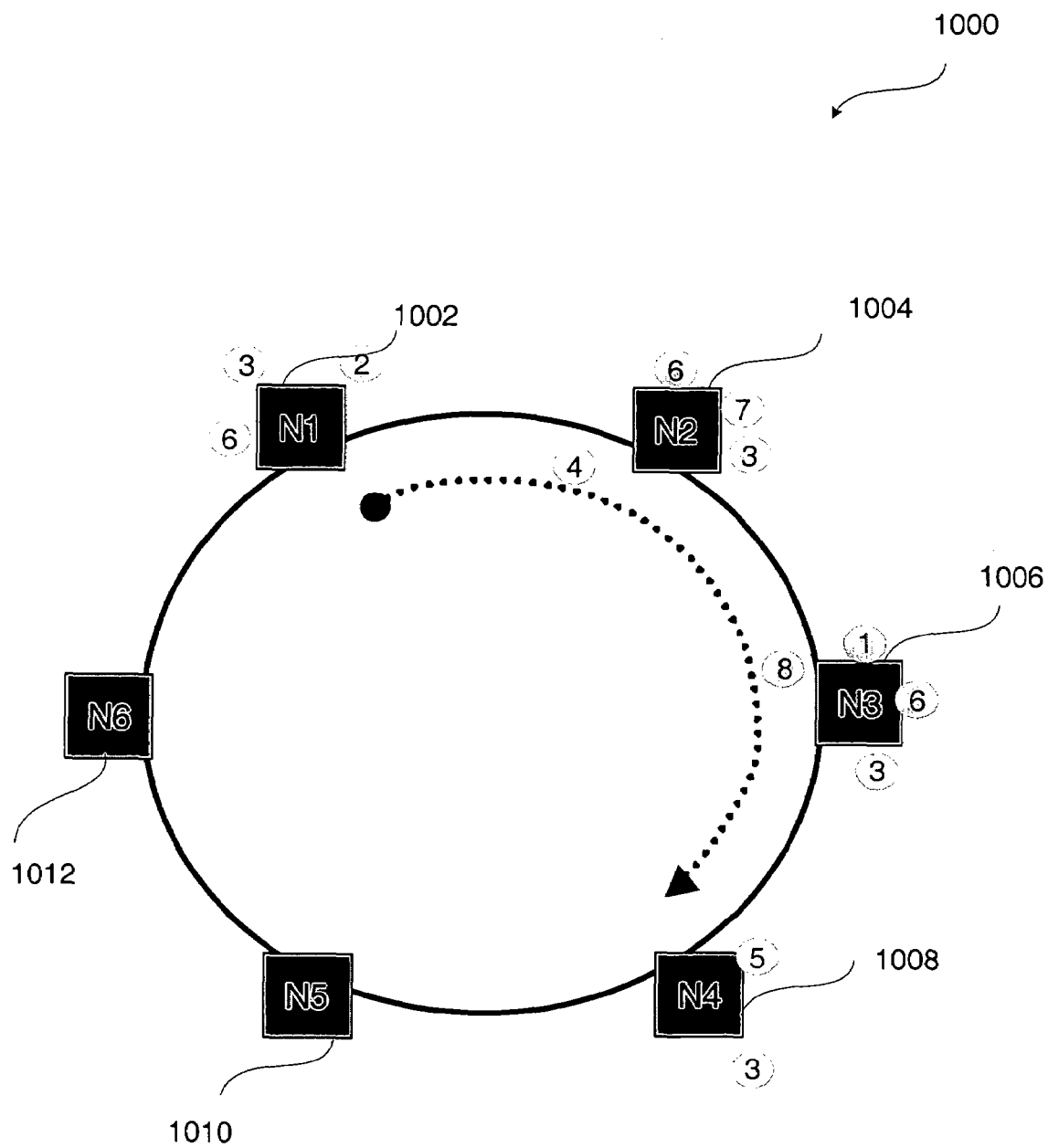
FIG. 10 illustrates an example sequence of events that occur when the third embodiment is used.

The creation of a service for a wavelength instance deploying the method of this embodiment is explained further with the help of an example presented in FIG. 10. The optical communication network shown in the figure consists of six NEs: N1 1002, N2 1004, N3 1006, N4 1008, N5 1010 and N6 1012. The head NE and the tail NE for the wavelength instance are N1 1002 and N4 1008 respectively whereas N2 1004 and N3 1006 are the intermediate NEs. The wavelength instance is added at the head NE N1 1002 and is dropped at the tail NE N4 1008. The sequence of operations that lead to the creation of service is captured in the sequence of events presented next. The event numbers in the following text correspond to the numbers shown within the gray circles in FIG. 10.

1—Through-request received at N3 1006. Completing the through-request is held off since the optical seam advertisements are not yet received.

2—Add-request is received at N1 1002.

N1 1002 creates optical seam and performs the add operation.

N1 1002 advertises optical seam creation.

N1 1002 launches wavelength instance with Channel ID

3—All NE's receive optical seam creation advertisement and record it.

4—N2 1004 observes valid channel ID. Wavelength instance is blocked because through-request is not yet received.

5—N4 1008 receives drop-request.

N4 1008 creates second optical seam and performs the drop operation.

N4 1008 advertises optical seam creation.

6—All NE's receive optical seam creation advertisements and record them.

7—N2 1004 receives through-request.

Since both optical seam advertisements are already known and valid channel ID is received, N2 1004 completes the through-request immediately.

8—N3 1006 observes valid channel ID.

Since both optical seam advertisements are already known, N3 completes the through-request.

Figure 11:
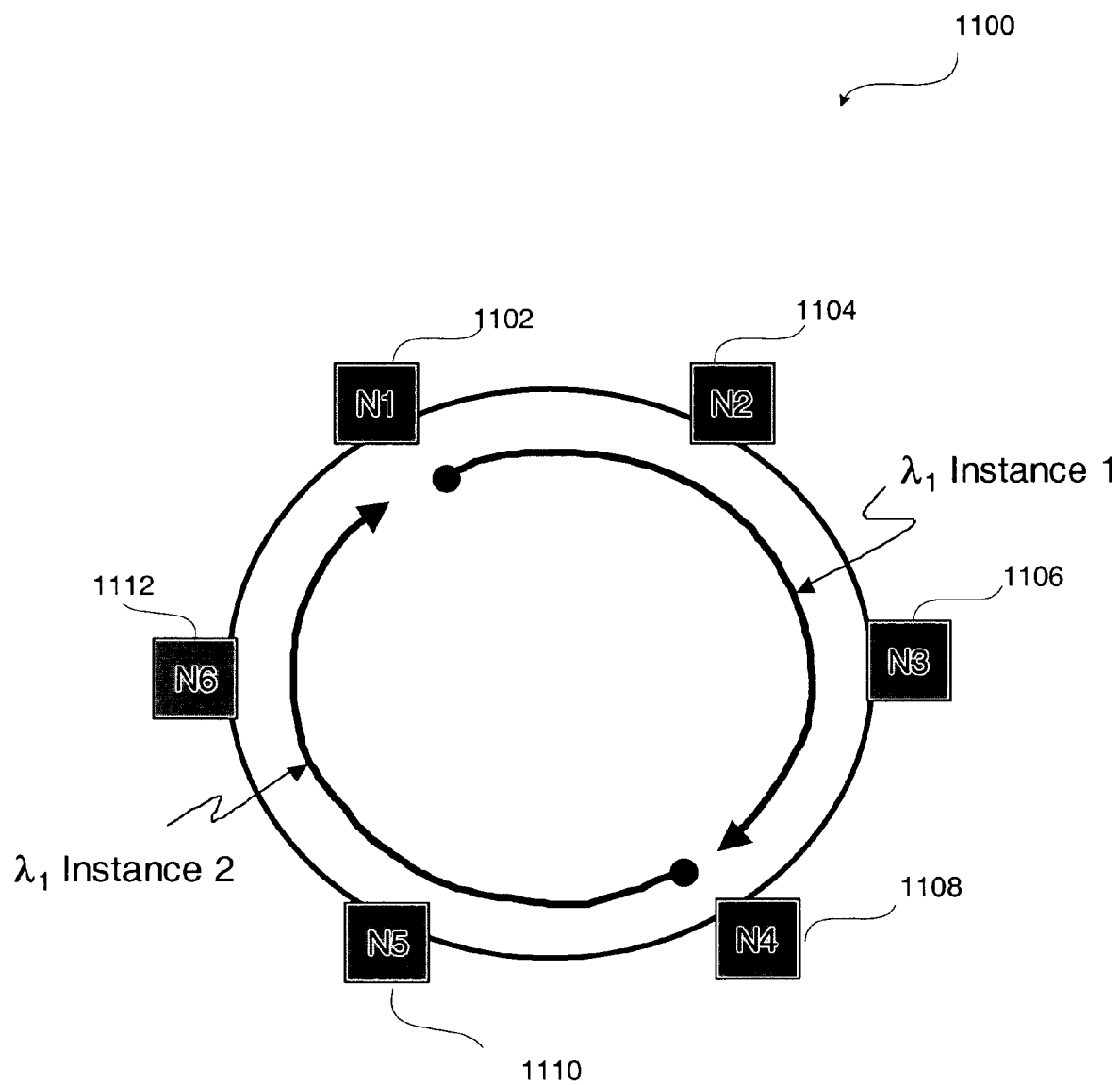
FIG. 11(a) presents an example optical communication network before an error or a device failure has occurred.
FIG. 11(b) presents an example optical communication network after an error or a device failure has occurred.
Figure 11B:
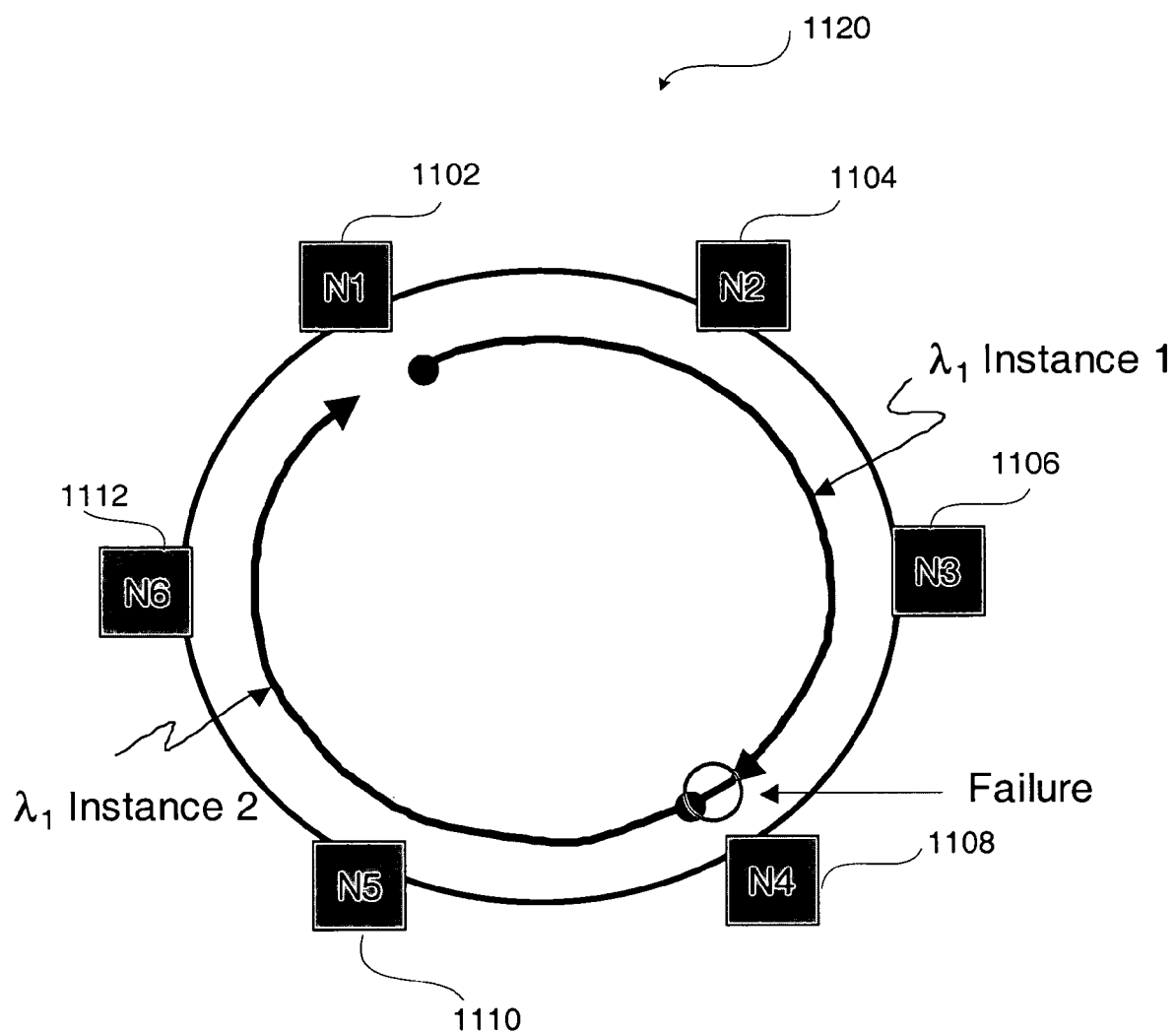

It is possible for ASE loops to occur even after a service is created. Such ASE loops can be caused by a mis-provisioning event or a device failure. Consider for example the example system presented in FIG. 11(*a*). The system consists of six NEs: N1 1102, N2 1104, N3 1106, N4 1108, N5 1110 and N6 1112. Two wavelength instances are considered. The head NE and the tail NE for $\lambda_1$ Instance 1 are N1 1102 and N4 1106 whereas the head NE and tail NE for $\lambda_1$ Instance 2 are N5 1110 and N6 1112. FIG. 11(*b*) describes a situation in which an error or failure has occurred at NE N4 1108 in the example system of FIG. 11(*a*). As a result and this NE forwards $\lambda_1$ Instance 1 onto N5 1110. A collision between $\lambda_1$ Instance 1 and $\lambda_1$ Instance 2 will occur. Such a collision is indicative of an ASE loop that spans all the NEs in the example system. Continuous monitoring of the wavelength instance is performed at each NE in the third embodiment to avoid such a problem. Whenever a collision of multiple wavelength instances occurs, multiple channel IDs instead of the single valid channel ID will be observed at NEs. As soon as a collision is detected, the detecting NE forces a break that disables the ASE loop.

The systems used in the embodiments of this invention include computing devices and network interfaces for intercommunication between the NEs. A computing device has a memory for storing the program that performs the steps of the method for avoiding ASE loops in optical communication networks.

The invention deploys effective methods that provide resilience. For example, two optical seams are used in the second and third embodiments. Thus, in the event of the failure of one optical seam, the other optical seam can still prevent an ASE loop. An important advantage of the invention is that it provides effective solutions to the problems that that include mis-provisioning events and device failures. Such problems are handled effectively both during service creation as well as during normal operation.

Numerous modifications and variations of the present invention are possible in light of the above teachings. For example, instead of broadcasting an optical seam creation advertisement to all the NEs in the network, the advertisement can be multicast to only those NEs that lie in the path for the wavelength instance. Moreover, instead of using OSPF-TE LSA broadcast, a path-based approach implemented via Generalized Multiprotocol Label Switching (GMPLS) for example, can be used for advertising the optical seams. In the case of the third embodiment, once a collision is detected, a break can be forced only at one NE. Also, the on-going monitoring approach could be achieved by careful use of Optical Spectrum Analyzers (OSA)/Optical Performance Monitoring (OPM) on either side of the WSXC device. It is therefore to be understood that within the scope of the appended claims, the invention may be practiced otherwise than as specifically described herein.

We claim:

1. A method for avoiding Amplified Spontaneous Emission (ASE) loops in an optical communication network, including a plurality of Network Elements (NEs) and transmitting a plurality of wavelength instances, the method comprising:

transmitting a wavelength instance from a head Network Element (NE), where the wavelength instance is added to the optical communication network, to a tail NE, where the wavelength instance is dropped from the optical communication network;

creating and advertising optical seams for the wavelength instance in the optical communication network, the optical seams preventing the wavelength instance from propagating on the optical communication network in unspecified directions; and processing the optical seams for the wavelength instance in the optical communication network, comprising:

receiving a through-request by an intermediate NE for the wavelength instance used for forwarding the wavelength instance to the next NE on a path for the wavelength instance, the path including the head NE, the tail NE and the intermediate NE for the wavelength instance;

receiving the advertisement from the head NE for the wavelength instance;

receiving the advertisement from the tail NE for the wavelength instance; and completing the through-request.

2. The method as claimed in claim 1, the creating and advertising optical seams for a wavelength instance further comprising:

receiving an add-request by the head NE for the wavelength instance for adding the wavelength instance into the optical communication network;

completing an optical seam for the wavelength instance by the head NE for the wavelength instance; and advertising the optical seam by the head NE for the wavelength instance to other NEs in the optical communication network.

3. The method as claimed in claim 1, the creating and advertising optical seams for the wavelength instance further comprising:

creating and advertising optical seam by the head NE for the wavelength instance; and creating and advertising optical seam by the tail NE for the wavelength instance.

4. The method as claimed in claim 3, the creating and advertising the optical seam by the head NE further comprising:

receiving an add-request by the head NE for the wavelength instance for adding the wavelength instance into the optical communication network;

completing the optical seam by the head NE for the wavelength instance; and advertising the optical seam by the head NE for the wavelength instance to other NEs in the optical communication network.

5. The method as claimed in claim 3, the creating and advertising the optical seam by the tail NE further comprising:

receiving a drop-request by the tail NE for the wavelength instance for dropping the wavelength instance from the optical communication network;

completing the optical seam by the tail NE for the wavelength instance; and advertising the optical seam by the tail NE for the wavelength instance to other NEs in the optical communication network.

6. A method for avoiding Amplified Spontaneous Emission (ASE) loops in an optical communication network, including a plurality of Network Elements (NEs) and transmitting a plurality of wavelength instances, the method comprising the steps of:

transmitting a wavelength instance from a head Network Element (NE), where the wavelength instance is added to the optical communication network, to a tail NE, where the wavelength instance is dropped from the optical communication network;

creating an optical seam by the head NE for the wavelength instance in the optical communication network, the optical seam preventing the wavelength instance from propagating in the optical communication network in unspecified directions;

creating an optical seam by the tail NE for the wavelength instance in the optical communication network;

processing the optical seams at intermediate NEs in the optical communication network, comprising:

receiving a through-request by an intermediate NE for the wavelength instance for forwarding the wavelength instance to the next NE on a path for the wavelength instance, the path including the head NE, the tail NE and the intermediate NE for the wavelength instance;

receiving the advertisement from the head NE for the wavelength instance;

receiving the advertisement from. the tail NE for the wavelength instance;

receiving an identification of the wavelength instance; and completing the through-request; and eliminating collisions among wavelength instances.

7. The method as claimed in claim 6, the creating the optical seam by the head NE further comprising:

receiving an add-request by the head NE for the wavelength instance for adding the wavelength instance into the optical communication network;

completing the optical seam by the head NE for the wavelength instance; and advertising the optical seam by the head NE for the wavelength instance to other NEs in the optical communication network.

8. The method as claimed in claim 6, creating the optical seam by the tail NE further comprising:

receiving a drop-request by the tail NE for the wavelength instance for dropping the wavelength instance from the optical communication network;

completing the optical seam by the tail NE for the wavelength instance; and advertising the optical seam by the tail NE for the wavelength instance to other NEs in the optical communication network.

9. The method as claimed in claim 6, the receiving the identification of the wavelength instance comprising receiving a unique signature in the form of a low frequency dither tone modulation.

10. The method as claimed in claim 6, the eliminating collisions among wavelength instances further comprising:

identifying a collision of wavelength instances at a NE; and forcing a break at the NE for disabling an ASE.

11. The method as claimed in claim 10, the identifying the collision further comprising:

monitoring wavelength instances continuously; and identifying identifications of wavelength instances generated in an instant of the collision.

12. A system for avoiding Amplified Spontaneous Emission (ASE) loops in an optical communication network, including a plurality of Network Elements (NEs) and transmitting a plurality of wavelength instances, the system comprising:

means for transmitting a wavelength instance from a head Network Element (NE), where the wavelength instance is added to the optical communication network, to a tail NE, where the wavelength instance is dropped from the optical communication network;

means for creating and advertising optical seams for the wavelength instance in the optical communication network, the optical seams preventing the wavelength instance from propagating on the optical communication network in unspecified directions; and means for processing the optical seams for the wavelength instance in the optical communication network, comprising:

means for receiving a through-request by an intermediate NE for the wavelength instance for forwarding the wavelength instance to the next NE on a path for the wavelength instance, the path including the head NE. the tail NE and the intermediate NE for the wavelength instance;

means for receiving the advertisement from the head NE for the wavelength instance;

means for receiving the advertisement from the tail NE for the wavelength instance; and means for completing the through-request.

13. The system as claimed in claim 12, the means for creating and advertising optical seams for the wavelength instance further comprising:

means for receiving an add-request by the head NE for the wavelength instance for adding the wavelength instance into the optical communication network;

means for completing an optical seam for the wavelength instance by the head NE for the wavelength instance; and means for advertising the optical seam by the head NE for the wavelength instance to other NEs in the optical communication network.

14. The system as claimed in claim 12, the means for creating and advertising optical seams for the wavelength instance further comprising:

means for creating and advertising an optical seam by the head NE for the wavelength instance; and means for creating and advertising an optical seam by the tail NE for the wavelength instance.

15. The system as claimed in claim 14, the means for creating and advertising the optical seam by the head NE further comprising:

means for receiving an add-request by the head NE for the wavelength instance for adding the wavelength instance into the optical communication network;

means for completing the optical seam by the head NE for the wavelength instance; and means for advertising the optical seam by the head NE for the wavelength instance to other NEs in the optical communication network.

16. The system as claimed in claim 14, the means for creating and advertising the optical seam by the tail NE further comprising:.

means for receiving a drop-request by the tail NE for the wavelength instance for dropping the wavelength instance from the optical communication network;

means for completing the optical seam by the tail NE for the wavelength instance; and means for advertising the optical seam by the tail NE for the wavelength instance to other NEs in the optical communication network.

17. A system for avoiding Amplified Spontaneous Emission (ASE) loops in an optical communication network, including a plurality of Network Elements (NEs) and transmitting a plurality of wavelength instances, the system comprising:

means for transmitting a wavelength instance from a head Network Element (NE), where the wavelength instance is added to the optical communication network, to a tail NE, where the wavelength instance is dropped from the optical communication network;

means for creating an optical seam by the head NE for the wavelength instance, the optical seams preventing the wavelength instance from propagating in the optical communication network in unspecified directions;

means for creating an optical seam by the tail NE for the wavelength instance;

means for processing the optical seams at intermediate NEs in the optical communication network, comprising:

means for receiving a through-request by an intermediate NE for the wavelength instance for forwarding the wavelength instance to the next NE on a path for the wavelength instance, the path including the head NE, the tail NE and the intermediate NE for the wavelength instance;

means for receiving the advertisement from the head NE for the wavelength instance;

means for receiving the advertisement from the tail NE for the wavelength instance;

means for receiving an identification of the wavelength instance;

means for completing the through-request; and means for eliminating collisions among wavelength instances.

18. The system as claimed in claim 17, the means for creating the optical seam by the head NE comprising:

means for receiving an add-request by the head NE for the wavelength instance for adding the wavelength instance into the optical communication network;

means for completing the optical seam by the head NE for the wavelength instance; and means for advertising the optical seam by the head NE for the wavelength instance to other NEs in the optical communication network.

19. The system as claimed in claim 17, the means for creating the optical seam by the tail NE comprising:

means for receiving a drop-request by the tail NE for the wavelength instance for dropping the wavelength instance from the optical communication network;

means for completing the optical seam by the tail NE for the wavelength instance; and means for advertising the optical seam by the tail NE for the wavelength instance to other NEs in the optical communication network.

20. The system as claimed in claim 17, the identification of the wavelength instance comprising a unique signature in the form of a low frequency dither tone modulation.

21. The system as claimed in claim 17, the means for eliminating collisions among wavelength instances further comprising:

means for identifying a collision of wavelength instances at a NE; and means for forcing a break at the NE or disabling an ASE.

22. The system as claimed in claim 21, the means for identifying the collision further comprising:

means for monitoring wavelength instances continuously; and means for identifying identifications of wavelength instances generated in an instant of the collision.

* * * * *

UNITED STATES PATENT AND TRADEMARK OFFICE
CERTIFICATE OF CORRECTION

PATENT NO. : 7,668,460 B2 Page 1 of 1
APPLICATION NO. : 11/452200
DATED : February 23, 2010
INVENTOR(S) : Carpini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Twenty-eighth Day of December, 2010

David J. Kappos
*Director of the United States Patent and Trademark Office*